Aug. 23, 1955  W. E. EGERTON  2,715,878
MACHINE FOR CUTTING AND FILLING CONFECTIONERY ARTICLES
Filed June 4, 1952  2 Sheets-Sheet 1
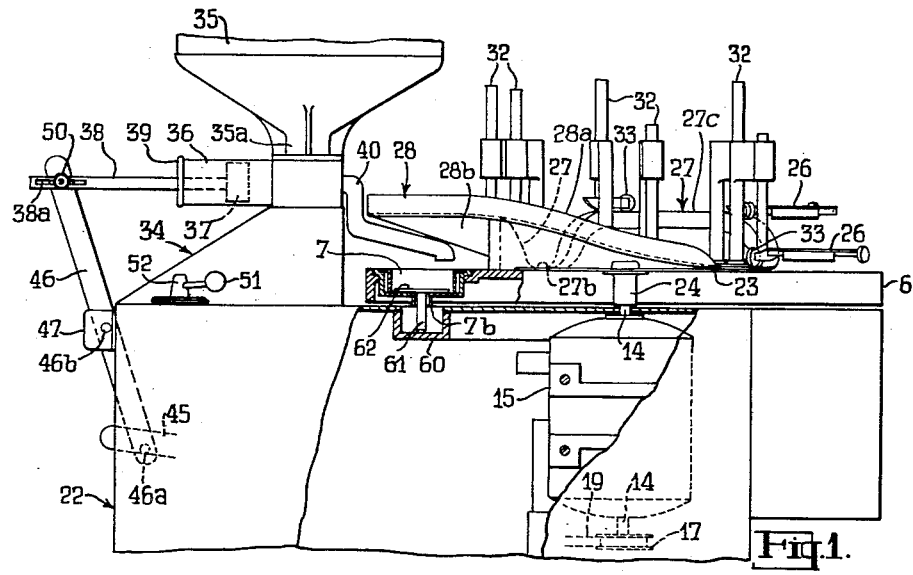
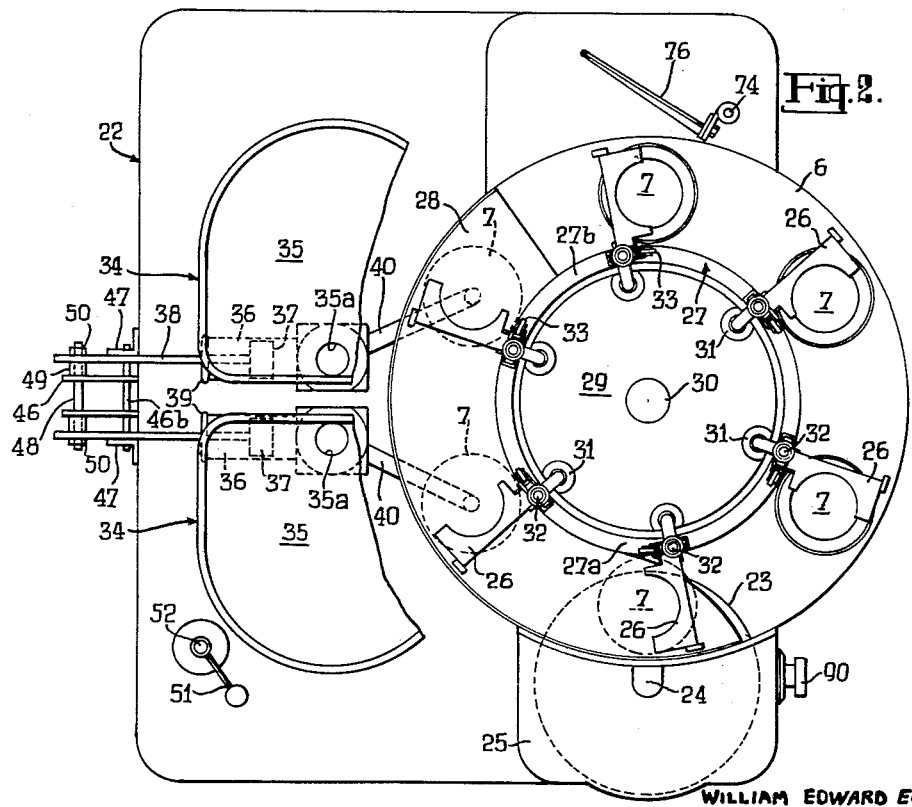
WILLIAM EDWARD EGERTON
Inventor Aug. 23, 1955 W. E. EGERTON 2,715,878
MACHINE FOR CUTTING AND FILLING CONFECTIONERY ARTICLES
Filed June 4, 1952 2 Sheets-Sheet 2
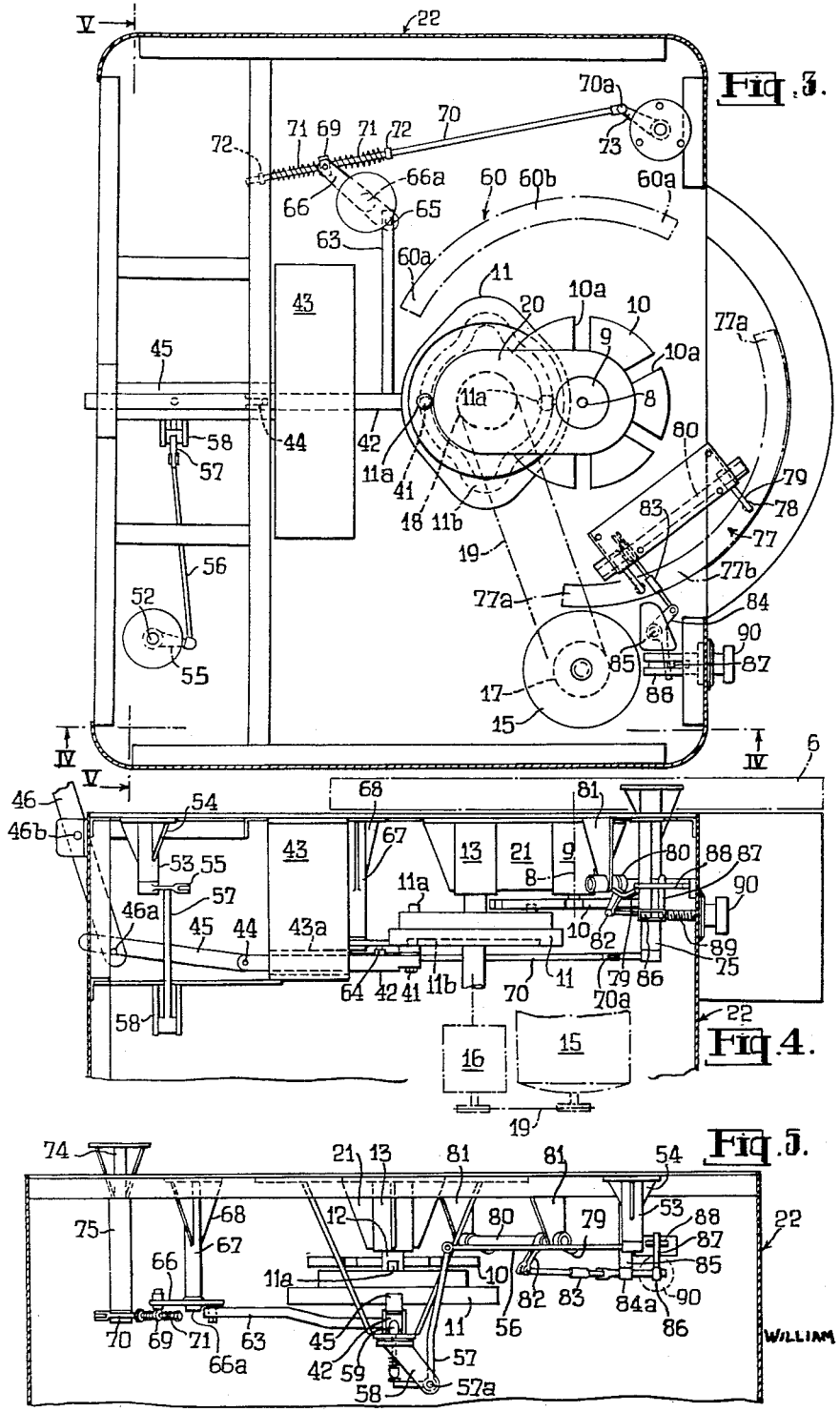
WILLIAM EDWARD EGERTON
Inventor United States Patent Office 2,715,878
Patented Aug. 23, 1955

2,715,878

MACHINE FOR CUTTING AND FILLING CONFECTIONERY ARTICLES

William Edward Egerton, Kingston-upon-Hull, England, assignor to Egerton Engineering Co. Limited, Ilkley Hall, Ilkley, England Application June 4, 1952, Serial No. 291,731

Claims priority, application Great Britain June 5, 1951

4 Claims. (Cl. 107—1)

The present invention relates to a machine for cutting and filling confectionery articles.

According to the present invention a machine for the purpose set forth includes in combination a first conveyor mechanism to displace the articles along a predetermined path, a cutter disposed adjacent the said path to wholly sever the upper portion of each article from the lower portion thereof, a filling-material dispensing device disposed adjacent the said path and after the cutter to deposit a charge of filling-material on said lower portion of each article, and a second conveyor mechanism to displace said upper portion of each article away from the said lower portion thereof prior to said deposition of filling-material and to replace the said upper portion over the said lower portion after said deposition operation.

The first conveyor mechanism may consist of a rotatable platform disposed horizontally and provided with a plurality of receptacles for the articles mounted thereon.

In a preferred form of the invention for use with articles of medium or small size, a rotatable platform of the above type is intermittently rotated by means of a prime mover so as to enable the lower portion of each article to remain stationary during the deposition of filling material thereupon.

The second conveyor mechanism, when used with a rotatable platform, may comprise a plurality of pivoted arms, radiating from the axis of rotation of, and rotatable with the platform, a stationary cam ring concentric with the said axis of rotation and over which the said arms travel during rotation, and an arcuate platform, disposed above a portion of the path of the receptacles and provided with ascending and descending ramps, whereby the severed upper portion of each article is transported from the rotatable platform to the arcuate platform and from the arcuate platform to the rotatable platform by means of the radiating arms. Deposition of filling material takes place upon the lower portion of each article as the latter passes under the arcuate platform.

To facilitate the cutting of the articles, the depth of the receptacles may be adjustable.

To facilitate the removal of the filled articles, means may be provided for raising the articles clear of the side walls of their receptacles prior to removal from the rotatable platform. For this latter purpose, an ejector arm, having a rotary motion co-operating with the intermittent motion of the rotatable platform, may be disposed adjacent the rotatable platform beyond the point at which the upper and lower portions of each article are re-united.

A dispensing device for depositing filling-material may take the form of a piston and cylinder assembly, said piston or pistons being actuated by a prime mover to deliver a predetermined charge or charges of filling-material to the lower half of each article, at an instant or instants when the rotatable platform is temporarily at rest. A clutch mechanism may also be provided to connect and disconnect the pumping mechanism to and from the prime mover.

The cutter may take the form of a fixed knife blade against which the article is forced by means of the rotating platform. It is preferred however to use a rotating disc as a cutter.

The invention will now be further described by reference to the accompanying drawings in which:

Fig. 1 is a side view partly in section of a machine for cutting and filling confectionery articles according to the present invention, in which for the sake of clarity, one of the receptacles has been displaced from its true position relative to the rest of the machine as shown in Fig. 2.

Fig. 2 is a plan view of the machine shown in Fig. 1.

Fig. 3 is further plan view of the machine shown in Fig. 1 illustrating those parts of the machine which are concealed beneath the parts visible in Fig. 2.

Fig. 4 is a section along the line IV—IV of Fig 3 and

Fig. 5 is a section along the line V—V of Fig. 3.

A first conveyor mechanism in the form of a rotatable platform 6 (Figs. 1, 2 and 4) provided with receptacles 7 in which to support confectionery articles (not shown), is mounted on an intermittently rotatable shaft 8 (shown as a chained dotted line in Fig. 4) mounted in a bearing 9, and actuated by means of a Geneva motion (Figs. 3, 4 and 5) comprising a Geneva wheel 10 mounted on the lower end of shaft 8 and a Geneva platform 11 mounted on a rotatable shaft 12 in a bearing 13. Pins 11a on platform 11 engage in slots 10a on wheel 10 causing it to rotate intermittently when shaft 12 is rotated from a driving shaft 14 of a motor or prime mover 15 (Figs. 1, 3 and 4) through a reduction gear box 16 by means of driving wheels 17, 18 linked by a driving band 19. Bearings 9, 13 are supported by plate 20 and reinforcement cleats 21 in machine support assembly 22, which also supports motor 15. A rotatable cutter 23 (Figs. 1 and 2), mounted on the upper end of driving shaft 14, which passes through a bearing 24, is provided with a protective cover 25 (shown in Fig. 2 only).

Referring now to a second conveyor mechanism comprising arms 26, a stationary cam ring 27 and an arcuate platform 28; a plate 29 secured to the upper surface of rotatable platform 6 by a locking screw 30 vertically above shaft 8, supports pillars 31 in which vertical shafts 32 formed integral with arms 26 are slidably mounted. Cam follower wheels 33 at the lower ends of shafts 32 rest upon the upper surface of cam ring 27, which, between points 27a and 27b, follows the rise and fall of arcuate platform 28. Arms 26 are thus seen to radiate from a point vertically above shaft 8, the axis of rotation of platform 6.

A dispensing device comprising two piston and cylinder assemblies 34, 34 is supported upon machine support assembly 22. Each supply funnel 35 communicates at its lower end 35a with a cylinder 36 in which a piston 37 is slidably mounted on a piston rod 38, passing through a disc bearing 39 at one end of each cylinder 36, the other end being in communication with a discharge pipe 40. A pin 41, confined in a channel 11b on the underneath of Geneva platform 11, is mounted on a shaft 42, slidably confined within a passage 43a of a block 43 supported within assembly 22 and pivotally connected at 44 to a link 45, which engages with pin 46a of a double link 46, pivoted about a pin 46b in brackets 47 of assembly 22. (Link 46 is omitted in Fig. 3.) A pin 48, rotatably mounted in the upper end of link 46, passes through adjustment slots 38a in piston rods 38, spaced from link 46 by means of collars 49, on pins 48, link 46 being located in slots 38a by means of nuts 50. This mechanism operates pistons 37.

In order to disconnect link 45 from pin 46a, a clutch mechanism operating from a handle 51 is provided. Rotation by handle 51 of a shaft 52 in a bearing 53, reinforced by cleats 54, mounted in assembly 22, rotates a crank 55 connected by a rod 56 to a lever 57, pivoted at 57a in a bracket 58 supported in assembly 22, causing a plunger 59 to lift link 45 clear of pin 46a. This action is reversible.

A stationary cam track 60, supported within assembly 22, contacts the lower end of a pin 61 supporting a base plate 62 and slidably mounted in a bearing 7b of each receptacle 7. The track is lowest at its ends 60a and highest at 60b, being smoothly graded therebetween. The level of base plate 62 varies as receptacles 7 pass over cam track 60.

A link 63 is pivotally attached at 64 to shaft 42 and at 65 to a crank 66, pivoted at 66a to a shaft 67, reinforced by cleats 68, mounted on assembly 22. The end of crank 66 remote from link 63 is pivotally attached to a collar 69 mounted on a shaft 70 and prevented from sliding thereon under normal conditions by means of springs 71 and nuts 72. Shaft 70 is pivotally attached at 70a to a crank 73 on a shaft 74 in a bearing 75 supported in assembly 22, an ejector arm 76 being mounted on the upper end of shaft 74.

Means for adjusting the depth of the receptacles at a point in the path of the articles adjacent the cutter 23 take the form of a movable cam track 77 which contacts the lower ends of pins 61 and is supported upon pins 78 resting on arms 79 of a rotatable shaft 80 mounted in brackets 81 on assembly 22. A crank 82 on shaft 80 is connected by means of a link 83 to a lever 84 pivoted at 84a to a shaft 85 supported by assembly 22. The end of lever 84 remote from link 83 passes through a slotted member 86 formed integral with a bar 87 the upper end of which is slidably confined within a slotted plate 88 supported in assembly 22. An adjusting screw 89 turned by a knob 90 contacts slotted member 86. As in the case of cam track 60, cam track 77 is lowest at its ends 77a and highest at 77b.

In operating the above described machine, the depth of the receptacles is first adjusted by means of knob 90 so that the articles placed therein may be severed at the desired position by means of cutter 23, rotated by motor 15. The top half of each severed article is forced by means of an arm 26, up a ramp 28a, along arcuate platform 28, and down a ramp 28b where it is deposited on top of the corresponding lower half of the article, which meanwhile has passed under arcuate platform 28 and received a charge of filling-material from each of discharge pipes 40.

From the shape of channel 11b of Geneva platform 11 and the relative disposition of pins 11a, it will be appreciated that pistons 37 will remain stationary while Geneva wheel 10 and hence rotatable platform 6 is intermittently rotating. Conversely, the platform 6 remains at rest in the position shown in Fig. 2 while pistons 37 are in motion. On the back stroke of each piston 37, filling-material contained in each supply funnel 35 is drawn into cylinder 36 and on the forward stroke, discharged via pipe 40 onto the article.

As each filled article approaches a point disposed above point 60b on cam track 60, base plate 62, on which the article rests, rises clear of receptacle 7 and the article is removed from the track by means of the rotation of ejector arm 76 operated from Geneva platform 11 as described previously. Arms 26 are raised clear of ejector arm 76 by means of portion 27c of cam ring 27. Owing to the provision of springs 71 on shaft 70, ejector arm 76 may be held by the hand of an operator without stopping the machine if so desired.

I claim:

1. A machine for cutting and filling confectionery articles comprising in combination a support assembly, a travelling platform mounted in said support assembly, a plurality of receptacles located in said travelling platform, means to cause movement of said platform and its receptacles in a given closed path, a rotatable disc cutter mounted alongside said travelling platform, said disc being disposed in a horizontal plane and having an edge portion thereof overlapping said closed path completely in close proximity to said travelling platform, a fixed platform mounted above a portion of said closed path beyond said cutter, an ascending ramp and a descending ramp disposed above said path and attached at opposite ends of said fixed platform, each ramp having its upper end at the level of said fixed platform and its lower end in close proximity to said path, a stationary cam track mounted alongside said path, the height of said track above said rotatable platform being a maximum alongside said fixed platform and a minimum adjacent each of said ramp lower ends, a plurality of substantially horizontally disposed arms mounted upon said platform, each of said arms extending across said cam track and having a free end terminating in a position immediately rearwardly of one of said receptacles, means to permit vertical displacement of each of said arms sufficient to permit the portion of said arm extending across said cam track to contact said cam track throughout movement of said travelling platform, and a dispensing device mounted upon said support assembly and having a discharge pipe terminating beneath said fixed platform and above said path.

2. A machine for cutting and filling confectionery articles comprising in combination a support assembly, a rotatable platform mounted in said support assembly, a plurality of receptacles located in said rotatable platform, means to rotate said rotatable platform and its receptacles in a given closed path, intermittently about a vertical axis in said support assembly, a rotatable disc cutter mounted alongside said rotatable platform, said disc being disposed in a horizontal plane and having an edge portion thereof overlapping said closed path in close proximity to said platform, an arcuate platform disposed above a portion of said closed path beyond said cutter, an ascending ramp and a descending ramp disposed above said path and attached at opposite ends of said fixed platform, each ramp having its upper end at the level of said fixed platform and its lower end in close proximity to said path, a stationary cam ring concentrically disposed within said closed path, the height of said cam ring above said rotatable platform being a maximum adjacent said arcuate platform and a minimum adjacent each of said ramp lower ends, a plurality of substantially horizontally disposed arms, each of which is mounted upon said rotatable platform within said cam ring, and radiates outwardly from said vertical axis and across said cam ring to a position immediately rearward of one of said receptacles, means to permit vertical displacement of each of said arms sufficient to permit the portion of the arm extending across said cam track to contact said cam track throughout rotation of said platform, a dispensing device mounted upon said support assembly and having a discharge pipe terminating beneath said arcuate platform and above said path, and means to deliver a charge of filling material from said dispensing device through said discharge pipe when any one of said receptacles is disposed beneath said discharge pipe at an instant when the rotatable platform is temporarily at rest.

3. A machine for cutting and filling confectionery articles comprising in combination a support assembly, a rotatable platform mounted in said support assembly, a plurality of receptacles located in said rotatable platform, means to rotate said rotatable platform and its receptacles in a given closed path, intermittently about a vertical axis in said support assembly, a rotatable disc cutter mounted alongside said rotatable platform, said disc being disposed in a horizontal plane and having an edge portion thereof overlapping said closed path in close proximity to said platform, an arcuate platform disposed above a portion of said closed path beyond said cutter, an ascending ramp and a descending ramp disposed above said path and attached at opposite ends of said fixed platform, each ramp having its upper end at the level of said fixed platform and its lower end in close proximity to said path, a stationary cam ring concentrically disposed within said closed path, the height of said cam ring above said rotatable platform being a maximum adjacent said arcuate platform and a minimum adjacent each of said ramp lower ends, a plurality of substantially horizontally disposed arms, each of which is mounted upon said rotatable platform within said cam ring, and radiates outwardly from said vertical axis and across said cam ring to a position immediately rearward of one of said receptacles, means to permit vertical displacement of each of said arms sufficient to permit the portion of the arm extending across said cam track to contact said cam track throughout rotation of said platform, a dispensing device mounted upon said support assembly and having a discharge pipe terminating beneath said arcuate platform and above said path, an adjustable base plate disposed in each receptacle, a stationary cam mounted in said support assembly beneath said path, the height of said cam reaching a maximum beneath a point in said path beyond said descending ramp, a pin dependent from said base plate and contacting said cam, a rotatable shaft mounted vertically in said support assembly alongside the aforementioned point in said path beyond the descending ramp, a horizontally disposed ejector arm mounted upon said shaft at a level immediately above the level of said receptacles, said ejector arm being of a length sufficient to extend from said shaft across said path, and means to cause said ejector arm to rotate over said path when one of said receptacles reaches a position adjacent said shaft.

4. A machine for cutting and filling confectionery articles as claimed in claim 3 in which means are provided for adjusting the depth of the receptacles at a point in said path adjacent said cutter.

References Cited in the file of this patent

UNITED STATES PATENTS

| | | |
|---|---|---|
| 546,662 | Gage | Sept. 24, 1895 |
| 1,029,357 | Gage | June 1, 1912 |
| 1,108,454 | Maisch | Aug. 25, 1914 |
| 1,211,375 | Clayton | Jan. 2, 1917 |
| 1,816,536 | Joachimson | July 28, 1931 |
| 2,260,832 | Deutscher | Oct. 28, 1941 |
| 2,391,937 | Aruidson | Jan. 1, 1946 |
| 2,595,344 | Egerton et al. | May 6, 1952 |